(12) United States Patent
Keller

(10) Patent No.: US 8,063,813 B1
(45) Date of Patent: Nov. 22, 2011

(54) ACTIVE IMPROVISED EXPLOSIVE DEVICE (IED) ELECTRONIC SIGNATURE DETECTION

(75) Inventor: Walter J. Keller, Pittsburgh, PA (US)

(73) Assignee: Nokomis, Inc., Charleroi, PA (US)

( * ) Notice: Subject to any disclaimer, the term of this patent is extended or adjusted under 35 U.S.C. 154(b) by 94 days.

(21) Appl. No.: 12/422,646

(22) Filed: Apr. 13, 2009

Related U.S. Application Data

(60) Provisional application No. 61/124,080, filed on Apr. 14, 2008.

(51) Int. Cl.
*G01S 7/42* (2006.01)
*G01S 13/00* (2006.01)
*G08B 13/14* (2006.01)

(52) U.S. Cl. .......................... 342/22; 342/13; 340/572.2

(58) Field of Classification Search .............. 342/13–20, 342/22, 89, 90, 128, 129, 175; 340/572.2
See application file for complete search history.

(56) References Cited

U.S. PATENT DOCUMENTS

| | | | |
|---|---|---|---|
| 3,028,596 A * | 4/1962 | McGillen et al. ............. 342/351 |
| 3,599,211 A * | 8/1971 | Mardon ........................ 342/351 |
| 3,631,484 A * | 12/1971 | Augenblick .................... 342/46 |
| 3,707,672 A * | 12/1972 | Miller et al. ................... 324/239 |
| 3,732,567 A * | 5/1973 | Low et al. ...................... 342/128 |
| 3,911,435 A * | 10/1975 | Mardon et al. ................ 342/351 |
| 4,035,797 A * | 7/1977 | Nagy ............................ 342/104 |
| 4,053,891 A * | 10/1977 | Opitz ........................... 342/193 |
| 4,121,214 A * | 10/1978 | Marinaccio et al. ............. 342/15 |
| 4,303,910 A * | 12/1981 | McCann ..................... 340/572.2 |
| 4,648,124 A * | 3/1987 | Mantovani et al. ......... 455/67.13 |
| 5,073,782 A * | 12/1991 | Huguenin et al. ............. 342/179 |
| 5,177,445 A * | 1/1993 | Cross ............................. 324/637 |
| 5,191,343 A * | 3/1993 | Danzer et al. .................... 342/21 |
| 5,227,800 A * | 7/1993 | Huguenin et al. ............. 342/179 |
| 5,339,080 A * | 8/1994 | Steinway et al. ................ 342/22 |
| 5,552,705 A * | 9/1996 | Keller ............................ 324/239 |
| 5,592,170 A * | 1/1997 | Price et al. ...................... 342/22 |
| 5,668,342 A * | 9/1997 | Discher .............................. 86/50 |
| 5,900,833 A * | 5/1999 | Sunlin et al. .................... 342/22 |
| 6,049,301 A * | 4/2000 | Weagant ......................... 342/13 |
| 6,057,765 A * | 5/2000 | Jones et al. ................. 340/572.2 |
| 6,163,259 A * | 12/2000 | Barsumian et al. ......... 340/572.2 |
| 6,243,036 B1 * | 6/2001 | Chadwick et al. .............. 342/27 |
| 6,359,444 B1 * | 3/2002 | Grimes .......................... 324/633 |
| 6,359,582 B1 * | 3/2002 | MacAleese et al. ............. 342/22 |
| 6,480,141 B1 * | 11/2002 | Toth et al. ....................... 342/22 |
| 6,496,703 B1 * | 12/2002 | da Silva ..................... 455/456.4 |
| 6,700,526 B2 * | 3/2004 | Witten ............................ 342/22 |
| 6,765,527 B2 * | 7/2004 | Jablonski et al. .............. 342/193 |
| 6,864,825 B2 * | 3/2005 | Holly ............................. 342/13 |
| 6,870,889 B1 * | 3/2005 | Sugiura ........................ 375/340 |
| 6,897,777 B2 * | 5/2005 | Holmes et al. ............. 340/572.2 |
| 7,002,470 B1 * | 2/2006 | Miao ........................ 340/539.22 |
| 7,130,624 B1 * | 10/2006 | Jackson et al. ................ 455/420 |

(Continued)

*Primary Examiner* — Thomas Tarcza
*Assistant Examiner* — Peter Bythrow
(74) *Attorney, Agent, or Firm* — James Ray and Associates, LLC.

(57) ABSTRACT

The present invention provides an apparatus and method of detecting, locating, and suppressing electronic devices, specifically IEDs. This RF emission measurement device in some embodiments can also be considered a system for RF emission measurement, location, and suppression. In some embodiments the apparatus comprises a high sensitivity receiver for receiving and analyzing electronic emissions. In other embodiments the apparatus comprises a high sensitivity receiver and an electromagnetic source for illuminating, and/or suppressing an electromagnetic device. The electromagnetic source could be any electromagnetic emitter known in the art, for example a magnetron or an adjustable wideband electromagnetic emitter.

26 Claims, 2 Drawing Sheets

U.S. PATENT DOCUMENTS

| | | | |
|---|---|---|---|
| 7,138,936 B2* | 11/2006 | Duff et al. | 342/14 |
| 7,142,147 B2* | 11/2006 | Holly | 342/13 |
| 7,162,285 B2* | 1/2007 | Owens et al. | 455/575.5 |
| 7,391,356 B2* | 6/2008 | Brumley et al. | 342/13 |
| 7,512,511 B1* | 3/2009 | Schultz et al. | 702/127 |
| 7,515,094 B2* | 4/2009 | Keller, III | 342/90 |
| 7,639,178 B1* | 12/2009 | Mulbrook et al. | 342/146 |
| 7,671,784 B2* | 3/2010 | Steinway et al. | 342/22 |
| 7,777,671 B2* | 8/2010 | Schnitzer et al. | 342/193 |
| 7,782,251 B2* | 8/2010 | Bishop et al. | 342/179 |
| 2003/0034444 A1* | 2/2003 | Chadwick et al. | 250/225 |
| 2003/0179126 A1* | 9/2003 | Jablonski et al. | 342/22 |
| 2004/0041724 A1* | 3/2004 | Levitan et al. | 342/22 |
| 2004/0095243 A1* | 5/2004 | Holmes et al. | 340/572.2 |
| 2005/0064922 A1* | 3/2005 | Owens et al. | 455/575.5 |
| 2006/0082488 A1* | 4/2006 | Keller, III | 342/22 |
| 2007/0013577 A1* | 1/2007 | Schnitzer et al. | 342/90 |
| 2007/0063886 A1* | 3/2007 | Brumley et al. | 342/13 |
| 2008/0012579 A1* | 1/2008 | Kuhns et al. | 324/652 |
| 2008/0254738 A1* | 10/2008 | Brumley et al. | 455/1 |
| 2010/0182189 A1* | 7/2010 | Jung et al. | 342/22 |

* cited by examiner

US 8,063,813 B1

ACTIVE IMPROVISED EXPLOSIVE DEVICE (IED) ELECTRONIC SIGNATURE DETECTION

CROSS REFERENCE TO RELATED APPLICATION

This patent application is related to and claims priority from U.S. Provisional Patent Application Ser. No. 61/124,080 filed Apr. 14, 2008 and is herein incorporated by reference.

FIELD OF THE INVENTION

The present invention relates, in general, to a method of and an apparatus for significantly enhancing the manner in which electronic devices are located and, more particularly, this invention relates to a method of and an apparatus for significantly enhancing the manner in which improvised explosive devices are located.

BACKGROUND OF THE INVENTION

Much of the background of this invention is outlined in U.S. Pat. No. 7,515,094 and is herein incorporated by reference.

It has been demonstrated that there are significant advantages to the analysis of both intentional and unintentional emissions from electronic devices to garner information about the emitting equipment, the information processed by the equipment and the location of the equipment. Nearly all IEDs utilize a commercial electronic device as a triggering mechanism.

Examples include remote keyless entry devices, handheld radios, garage door openers and long-range cordless telephones. This contract seeks to leverage a patent-pending method of active IED detection through the stimulus of electromagnetic signatures that unintentionally emit from trigger electronics. The active Advanced Electromagnetic Location of Electronic Devices (AELED) system is a complete system comprised of sensitive passive detection and active illumination. Passive detection had been demonstrated in field tests to provide detection and identification of IED trigger electronic devices at range. The ability to further actively perturb the signatures of the devices and further demonstrate that improved detection is thereby possible has also been demonstrated.

Emission signatures also provide valuable information regarding the potential susceptibility and vulnerability of the systems to electromagnetic (EM) energy at those frequencies. Emission sources are often susceptible at the same frequencies where they emit. Antennas, apertures, through reciprocally are generally both good transmitters and good receivers. Cables, circuit traces, antennas typically emit and receive at same frequencies. From a system standpoint, EM energy that efficiently propagates from the device is often efficiently received by the device.

Some knowledge of the emitting frequencies may be leveraged offensively and some examples are outlined below.

The introduction of EM field strengths at select frequencies where the device is measured to be emitting, suitable to cause failure, degradation or temporary disruption may amplify and/or alter the unintentional radiation characteristics of the device. Damaged semiconductors, which are determined by breakdown characteristics, for instance may radiate robustly. The characteristic signatures of a specific device may be easier to pick out of the noise. The signature changes might be leveraged in numerous ways.

The introduction of EM field strengths at select frequencies suitable to cause failure, degradation or temporary disruption may amplify and/or alter the unintentional radiation characteristics of the device. Damaged semiconductors, determined by breakdown characteristics, for instance may radiate robustly. The characteristic signatures of a specific device may be easier to pick out of the noise. The signature changes might be leveraged in numerous ways. Some benefits might be: amplification of the emission signature when semiconductor components are degraded may improve the ability to detect, identify and track the emitter Field strengths sufficient to cause the described signature enhancement could be introduced through non-lethal technologies such as high-power microwave (HPM) or electromagnetic pulse (EMP) sources or other high power microwave sources (jammer, radars, stand-off weapons) that were designed for other applications in the field.

The field strengths necessary to cause the described responses may not have to be so robust. Lower field strengths in some cases may alter circuit function substantially. For example, oscillator instabilities at low field strengths can significantly alter the emission signature of such devices.

In geographical regions where background emissions are minimized by a lack of electronics among the local population there may be greater potential to leverage such techniques.

In tight packed cities non-lethal RF devices may be used to amplify emissions signatures to better track electronics, an individual or gather other useful information. An example would be proximity RF/HPM source directed towards a building. If the signature being tracked changes one would gain information about the occupants or contents of the building.

The integration of passive emission collection techniques and offensive RF strategies have synergies that when integrated and utilized efficiently may improve the remote location of electronics and individuals that have dependency on electronic equipment.

SUMMARY OF THE INVENTION

The present invention provides an apparatus and method of detecting, locating, and suppressing electronic devices, specifically IEDs. This RF emission measurement device in some embodiments can also be considered a system for RF emission measurement, location, and suppression. In some embodiments the apparatus comprises a high sensitivity receiver for receiving and analyzing electronic emissions. In other embodiments the apparatus comprises a high sensitivity receiver and an electromagnetic source for illuminating, and/or suppressing an electromagnetic device. The electromagnetic source could be any electromagnetic emitter known in the art, for example a magnetron or an adjustable wideband electromagnetic emitter.

In several embodiments multiple receivers and multiple electromagnetic sources are networked together, but positioned on separate platforms. A set of receivers and electromagnetic sources could be positioned together on one platform or each receiver and each electromagnetic source could be located on separate platforms or any combination thereof. For example, in one preferred embodiment a high sensitivity receiver is positioned on a land vehicle and an electromagnetic source is positioned on a robot. This configuration allows ground personnel to monitor the situation from a safe distance while a robot and its associated EM source move closer to the electronic device for illumination and/or suppression of the electronic device. This is particularly beneficial when the electronic device is or suspected of being an explosive or dangerous device. In another preferred embodiment multiple high sensitively receivers could be positioned on mobile vehicles, robots, unmanned vehicles and positioned on stationary structures these receivers being networked together to facilitate locating and detecting electronic devices. Optionally, this network of receivers could also me networked with one or more electromagnetic sources positioned on mobile and stationary platforms.

In many embodiments of the present invention, the RF measurement device is set to run in an automated manner. The RF measurement device could be setup as an unattended sensor capable of automatically detecting electronic devices and communicating this information to other networked devices and/or to a person. In several embodiments the RF measurement device is capable of automatically detecting and suppressing electronic devices. Preferably the automatic operation of the RF measurement device is implemented through software, but hardware could also be implemented. For example, the RF measurement device could be mounted in an automobile. When the automobile comes in proximity to a potentially dangerous electronic device the RF measurement device would alert the driver of the threat and its location. Optionally the RF measurement device could also suppress the electronic device and prevent its operation. This could also be implemented in the reverse that is to protect potential targets from mobile car bombs. Also, the RF measurement device could be mounted on a robot for autonomous and automatic operations. For example, the robot could search for IEDs, or other electronic devices. The robot could simply tag the location of device or actively suppress or detonate the device using an electromagnetic source.

In several embodiments of the invention, the RF measurement device would be capable of searching for electronic device in a passive mode and an active mode. In passive mode a high sensitivity receiver would search for electronics devices with out illumination from an electromagnetic source. In active mode a high sensitivity receiver would search for electronic devices with illumination from an electromagnetic source. Detection can be enhanced by correlating the received emissions from the electronic device in active and passive modes. Suppression of an electronic device can be verified by correlating the change in received emissions from the electronic device during suppression. Furthermore, an electronic device could be neutralized by disabling, damaging or destroying/detonating the device by means of sufficient electromagnetic energy at proper frequencies. The neutralization of electronic devices could also be verified by correlation as described above.

In still another embodiment the RF measurement device could be used to obtain information about an electronic device for targeting by another unit for suppression, neutralization, destruction, and/or detonation. For example, the RF measurement device could obtain information in regard to the location and the electromagnetic vulnerabilities of an electronic device so that another unit could properly configure their electromagnetic source to suppress, neutralize, destroy and/or detonate the target electronic device.

OBJECTS OF THE INVENTION

It is, therefore, one of the primary objects of the present invention to provide a RF emission measurement device for locating electronic devices.

Another object of the present invention is to provide a RF emission measurement device for locating improvised explosive devices (IEDs).

Still another object of the present invention is to provide a RF emission measurement device with an electromagnetic source for illuminating electronic devices to enhance their RF emissions for measurement.

Yet another object of the present invention is to provide a RF emission measurement device with an electromagnetic source for suppressing electronic devices so that they can not operate while suppressed.

An additional object of the present invention is to provide RF emission measurement device with an electromagnetic source for neutralizing electronic devices so that they can no longer operate permanently.

Yet another object of the present invention is to provide a RF emission measurement device that is networked with other RF emission measurement devices for enhanced measurement over a large geographical area.

In one embodiment the invention is a RF emission measurement device comprising: a receiver, wherein said receiver is configured to detect at least one electronic device by measuring at least one unintended RF emission given off by said at least one electronic device. In another embodiment the RF emission measurement device is used to locate the at least one electronic device that is giving off the at least one unintended RF emission. In another embodiment the RF emission measurement device is positioned on a vehicle. In yet another embodiment the RF emission measurement device is positioned on an architectural structure. In another embodiment the RF emission measurement device is positioned on top of a tower. In still another embodiment the RF emission measurement device is positioned on a vehicle and said RF emission measurement device is in use while the vehicle is in motion. In another embodiment the RF emission measurement device is positioned on an aircraft. In another embodiment the RF emission measurement device is positioned on an unmanned aerial vehicle. In yet another embodiment the RF emission measurement device is positioned on a robot. In still another embodiment the RF emission measurement device is positioned on an unmanned vehicle. In another embodiment the RF emission measurement device is an unattended sensor. In yet still another embodiment the RF emission measurement device is used to detect a device through at least one wall. In still another embodiment the RF emission measurement device is used to detect a device in a building through at least two walls. In yet another embodiment the RF emission measurement device is used to detect an explosive device. In still another embodiment the RF emission measurement device is used as a baggage screening device. In yet another embodiment the RF emission measurement device is used as a proximity detector. In still another embodiment the RF emission measurement device is used as a personnel screening device. In yet another device the RF emission measurement device is used as a cargo screening device. In still another embodiment the RF emission measurement device operates automatically through software for the detection of electronic devices. In yet another embodiment the RF emission measurement device is used to suppress and prevent the triggering of an IED. In still another embodiment the RF emission measurement device is used on a neutralized IED. In yet another embodiment the RF emission measurement device verifies suppression of an IED. In still another embodiment the RF emission measurement device is configured as a turnkey system. In yet another embodiment the RF emission measurement device operates in a passive automated detection mode. In still yet another embodiment the RF emission measurement device operates in a passive automated detection mode for the detection of at least two targets. In still yet another embodiment the RF emission measurement device is used to perform bomb diagnostics.

In yet another embodiment the invention is a RF emission measurement device comprising: a receiver, an electromagnetic source for enhancing at least one RF emission signature, wherein said receiver is configured to detect at least one electronic device by measuring at least one unintended enhanced RF emission given off by said at least one electronic device and enhanced by the electromagnetic source. In still another embodiment the electromagnetic source is positioned on a robot. In yet still another embodiment the electromagnetic source is positioned on a robot. In still another embodiment the electromagnetic source is positioned on a robot and the receiver is positioned on a vehicle. In another embodiment the electromagnetic source is positioned on a robot and the receiver is positioned on a man portable stand. In yet another embodiment a network of at least two RF emission measurement devices is positioned on at least two towers. In still another embodiment a network of at least two RF emission measurement devices is positioned on at least two unmanned aerial vehicles. In yet another embodiment a network of at least two RF emission measurement devices are positioned on at least one of a vehicle, an architectural structure, or any combination thereof. In still another embodiment the RF emission measurement device is used to detect an explosive device. In yet another embodiment the RF emission measurement device is used to detect an explosive device component or an explosive device factory. In still another embodiment the RF emission measurement device is used to detect vehicle borne IEDs. In yet still another embodiment the RF emission measurement device is used in a network to achieve the ability to detect electronics over a broad geographical range. In yet another embodiment the receiver is positioned on a first platform and the electromagnetic source is positioned on a second platform. In still another embodiment the RF emission measurement device operates automatically through software for the detection of electronic devices. In yet another embodiment the RF emission measurement device is used to suppress and prevent the triggering of an IED. In still another embodiment the RF emission measurement device is used to neutralize an IED. In yet another embodiment the electromagnetic source is a magnetron. In still another embodiment the RF emission measurement device operates in a passive automated detection mode. In yet another embodiment the RF emission measurement device operates in an active automated detection mode. In still another embodiment the RF emission measurement device operates in an active automated detection mode and a passive automated detection mode with correlation between said active automated detection mode and said passive automated detection mode. In yet another embodiment the RF emission measurement device operates in an active automated detection mode and a passive automated detection mode with correlation between said active automated detection mode and said passive automated detection mode for detection of at least two targets. In still another embodiment the electromagnetic source is a broadband frequency agile source. In yet another embodiment the RF emission measurement device is positioned on a robot and verifies suppression of an IED. In still another embodiment the RF emission measurement device is positioned on a robot and verifies suppression of an IED and quantifies a response that generates suppression. In yet another embodiment the RF emission measurement device verifies suppression of an IED. In still another embodiment the RF emission measurement device is positioned on robot for electronic trigger neutralization of an explosive device. In yet another embodiment the RF emission measurement device correlates measurements between active and passive detection for electronic trigger detection. In still another embodiment the RF emission measurement device is used to perform bomb diagnostics. In yet another embodiment the receiver is positioned on a first platform and continuously monitors the RF emissions; the electromagnetic source positioned on a robot provides illumination, suppression and neutralization by advancing toward the electronic device. In yet still another embodiment the electromagnetic source is a tunable frequency agile source integrated onto a platform for the detection of IED trigger electronics.

In addition to the various objects and advantages of the present invention described with some degree of specificity above it should be obvious that additional objects and advantages of the present invention will become more readily apparent to those persons who are skilled in the relevant art from the following more detailed description of the invention, particularly, when such description is taken in conjunction with the attached drawing figures and with the appended claims.

Figure 1:
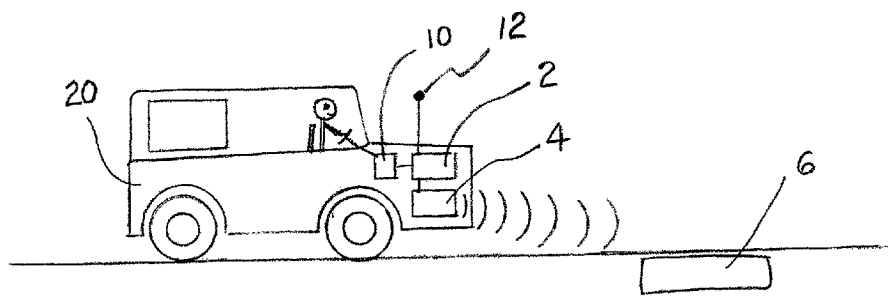
FIG. 1 is a schematic illustration of one embodiment of the present invention comprising an automobile platform.

BRIEF DESCRIPTION OF A PRESENTLY PREFERRED AND VARIOUS ALTERNATIVE EMBODIMENTS OF THE INVENTION

Prior to proceeding to the more detailed description of the present invention it should be noted that, for the sake of clarity and understanding, identical components which have identical functions have been identified with identical reference numerals throughout the several views illustrated in the drawing figures.

Reference is now made, more particularly, to FIG. 1 of the drawings. A receiver 2 and an electromagnetic source 4 are mounted onto an automobile platform 20. The receiver 2 and the electromagnetic source 4 are communicatively coupled to each other and to computer 10. It is envisioned that computer 10 may do most of the data processing, or data and signal processing could be handled by receiver 2 or some combination thereof. Receiver 2 is used to detect electronic devices, such as IED 6, by monitoring electromagnetic emission particularly RF emissions. Electromagnetic source 4 can be used to enhance the monitoring of such EM emissions by illuminating the target device, IED 6. By increasing its electromagnetic output at an effective resonant frequency, the electromagnetic source 4 can not only illuminate the target device but suppress the target, further output increases can even damage the target device beyond operation. As currently illustrated, the electromagnetic source 4 could detonate the IED 6 by increasing the electromagnetic field strength around the IED 6.

Figure 2:
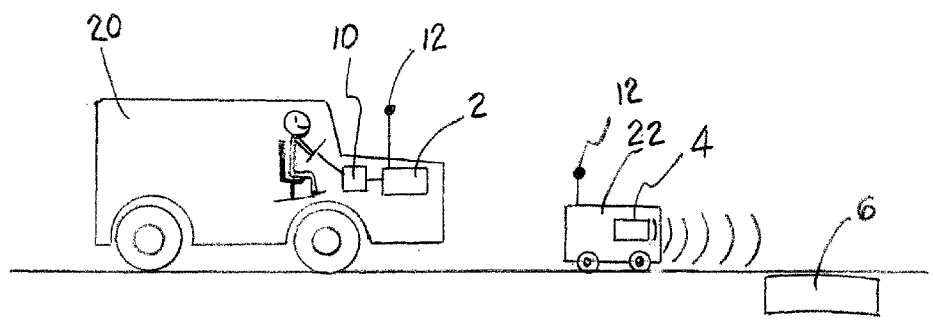
FIG. 2 is a schematic illustration of one embodiment of the present invention comprising an automobile platform and a robotic platform.

Reference is now made to FIG. 2 of the drawings. The receiver 2 is mounted onto an automobile platform 20. The electromagnetic source 4 is mounted onto robot platform 22.

The receiver 2 and the electromagnetic source 4 are communicatively coupled to each other and to computer 10. As illustrated communication coupling between the components of automobile platform 20 and robot platform 22 is accomplished through wireless communication devices 12. The wireless communication devices 12 could be any wireless communication means know in the art. It is envisioned that computer 10 may do most of the data processing, or data and signal processing could be handled by receiver 2 or some combination thereof. Additionally, electromagnetic source 4 or robotic platform 22 could have data and signal processing means. Receiver 2 is used to detect electronic devices, such as IED 6, by monitoring electromagnetic emission particularly RF emissions. Electromagnetic source 4 can be used to enhance the monitoring of such EM emissions by illuminating the target device, IED 6. By increasing its electromagnetic output at an effective resonant frequency, the electromagnetic source 4 can not only illuminate the target device but suppress the target, further output increases can even damage the target device beyond operation. As currently illustrated, the electromagnetic source 4 could detonate the IED 6 by increasing the electromagnetic field strength around the IED 6. With electromagnetic source 4 on robotic platform 22 the field strength around IED 6 could be increased by moving robotic platform 22 closer to IED 6 without increasing the output of the electromagnetic source 4.

Figure 3:
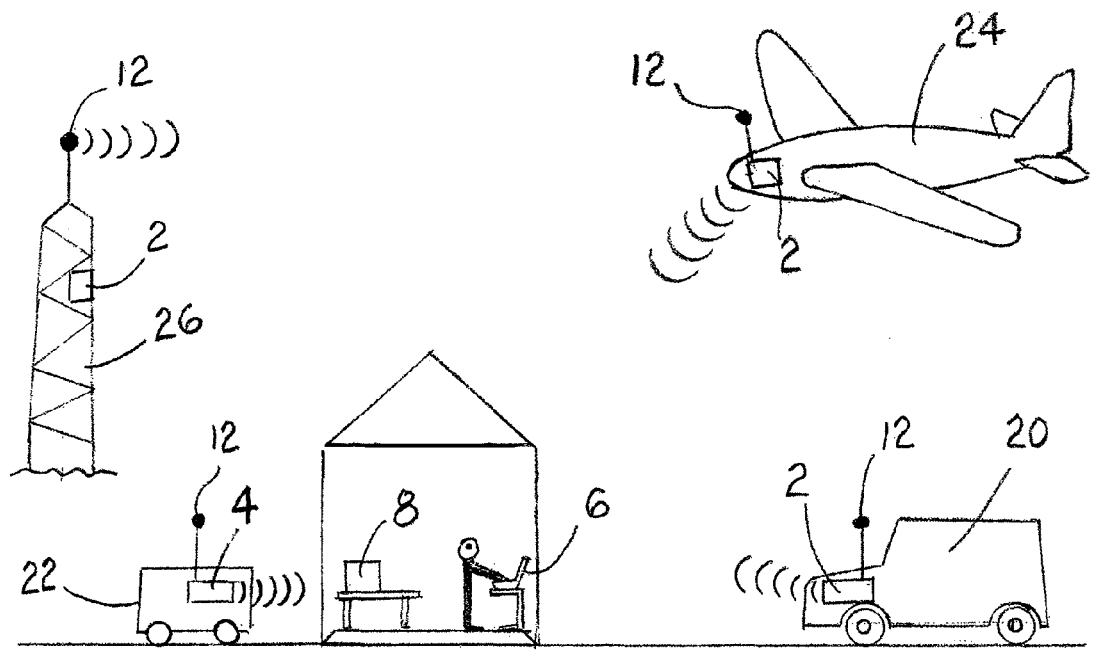
FIG. 3 is a schematic illustration of one embodiment of the present invention comprising a network of receivers on several platforms.

Reference is now made to FIG. 3 of the drawings. FIG. 3 is a schematic illustration of one embodiment of the present invention comprising a network of receivers on several platforms. Receivers 2 are positioned on several platforms including an automobile platform 20, an unmanned aerial vehicle platform 24 and a tower platform 26. The receivers 2 are networked together by means of wireless communication devices 12. The wireless communication devices 12 could be any wireless communication means know in the art. In this embodiment the several receivers 2 correlate their measurements of electronic emissions in order to more accurately locate electronic device 6 and electronic component 8. This configuration also enables the monitoring of a broad geographical area. Optionally, electromagnetic source 4 positioned on robotic platform 22 could be used for active illumination, suppression or neutralization of electronic device 6 and or electronic component 8.

Figure 4:
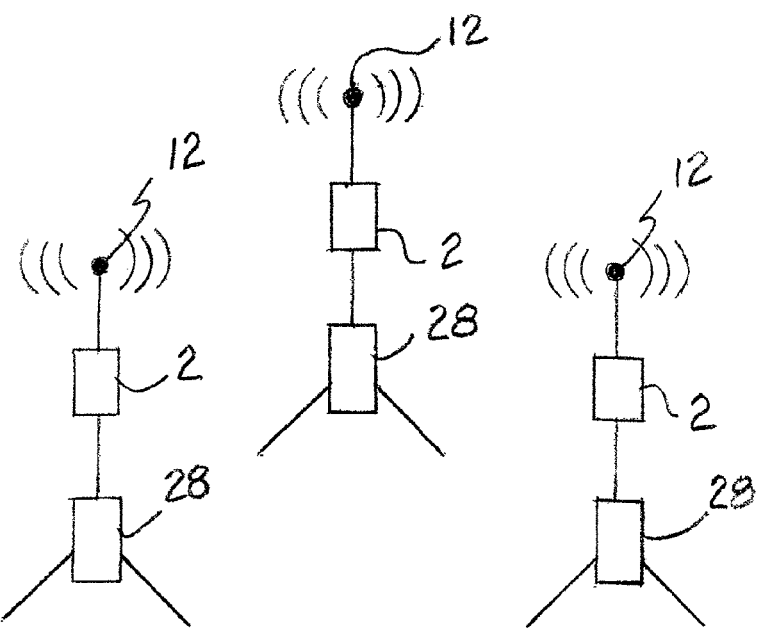
FIG. 4 is a schematic illustration of one embodiment of the present invention comprising a network of unattended ground sensors for detecting electronic devices.

Reference is now made to FIG. 4, a schematic illustration of one embodiment of the present invention comprising a network of unattended ground sensors for detecting electronic devices. Each unattended ground sensor stand 28 is equipped with a receiver 2 and wireless communication device 12 for communicating with each other and a gateway node (not shown) that directs data to a command center or other user. This configuration enables the monitoring of large geographical areas. Preferably the receivers 2 operate automatically in detecting electronic devices. Also, the receivers 2 are preferably networked to enable correlation of electronic emission measurements between and among receivers 2 to better detect and identify electronic devices.

While a presently preferred and various alternative embodiments of the present invention have been described in sufficient detail above to enable a person skilled in the relevant art to make and use the same it should be obvious that various other adaptations and modifications can be envisioned by those persons skilled in such art without departing from either the spirit of the invention or the scope of the appended claims.

I claim:

1. A RF emission measurement device comprising:
a receiver,
an electromagnetic source for enhancing at least one RF emission signature,
wherein said receiver is configured to detect at least one electronic device by measuring at least one unintended enhanced RF emission given off by said at least one electronic device and enhanced by the electromagnetic source, wherein the receiver is positioned on a first platform and the electromagnetic source is positioned on a second platform, said first platform and said second platform being coordinated to improve performance of said RF emission measurement device.

2. A RF emission measurement device comprising:
a receiver,
wherein said receiver is configured to detect at least one electronic device by passively measuring without active illumination at least one unintended RF emission given off by said at least one electronic device, wherein the RF emission measurement device is used on a neutralized IED to verify that the IED is neutralized.

3. A RF emission measurement device comprising:
a receiver,
wherein said receiver is configured to detect at least one electronic device by passively measuring without active illumination at least one unintended RF emission given off by said at least one electronic device, wherein the RF emission measurement device verifies suppression of an IED.

4. A RF emission measurement device comprising:
a receiver,
an electromagnetic source for enhancing at least one RF emission signature,
wherein said receiver is configured to detect at least one electronic device by measuring at least one unintended enhanced RF emission given off by said at least one electronic device and enhanced by the electromagnetic source, wherein the RF emission measurement device operates in an active automated detection mode and a passive automated detection mode with correlation between said active automated detection mode and said passive automated detection mode.

5. A RF emission measurement device comprising:
a receiver,
an electromagnetic source for enhancing at least one RF emission signature,
wherein said receiver is configured to detect at least one electronic device by measuring at least one unintended enhanced RF emission given off by said at least one electronic device and enhanced by the electromagnetic source, wherein the RF emission measurement device operates in an active automated detection mode and a passive automated detection mode with correlation between said active automated detection mode and said passive automated detection mode for detection of at least two targets.

6. A RF emission measurement device comprising:
a receiver,
an electromagnetic source for enhancing at least one RF emission signature,
wherein said receiver is configured to detect at least one electronic device by measuring at least one unintended enhanced RF emission given off by said at least one electronic device and enhanced by the electromagnetic source, wherein the RF emission measurement device is positioned on a ground based robot and verifies suppression of an IED.

7. A RF emission measurement device comprising:
a receiver,
an electromagnetic source for enhancing at least one RF emission signature,
wherein said receiver is configured to detect at least one electronic device by measuring at least one unintended enhanced RF emission given off by said at least one electronic device and enhanced by the electromagnetic source, wherein the RF emission measurement device is positioned on a robot and verifies suppression of an IED and quantifies a response that generates suppression.

8. A RF emission measurement device comprising:
a receiver,
an electromagnetic source for enhancing at least one RF emission signature,
wherein said receiver is configured to detect at least one electronic device by measuring at least one unintended enhanced RF emission given off by said at least one electronic device and enhanced by the electromagnetic source, wherein the RF emission measurement device verifies suppression of an IED.

9. A RF emission measurement device comprising:
a receiver,
an electromagnetic source for enhancing at least one RF emission signature,
wherein said receiver is configured to detect at least one electronic device by measuring at least one unintended enhanced RF emission given off by said at least one electronic device and enhanced by the electromagnetic source, wherein the RF emission measurement device correlates measurements between active and passive detection for electronic trigger detection.

10. A RF emission measurement device comprising:
a receiver,
an electromagnetic source for enhancing at least one RF emission signature,
wherein said receiver is configured to detect at least one electronic device by measuring at least one unintended enhanced RF emission given off by said at least one electronic device and enhanced by the electromagnetic source, wherein the RF emission measurement device is used to perform bomb diagnostics.

11. A RF emission measurement device comprising:
a receiver,
wherein said receiver is configured to detect at least one electronic device by passively measuring without active illumination at least one unintended RF emission given off by said at least one electronic device, wherein the RF emission measurement device is used to perform bomb diagnostics.

12. A RF emission measurement device comprising:
a receiver,
an electromagnetic source for enhancing at least one RF emission signature,
wherein said receiver is configured to detect at least one electronic device by measuring at least one unintended enhanced RF emission given off by said at least one electronic device and enhanced by the electromagnetic source, wherein the receiver is positioned on a first platform and continuously monitors the RF emissions; the electromagnetic source positioned on a robot provides illumination, suppression and neutralization by advancing toward the electronic device.

13. A RF emission measurement device comprising:
a receiver,
an electromagnetic source for enhancing at least one RF emission signature,
wherein said receiver is configured to detect and verify a state of at least one electronic device by measuring at least one unintended enhanced RF emission given off by said at least one electronic device and enhanced by the electromagnetic source,
wherein the receiver is positioned on a first platform and the electromagnetic source is positioned on a second platform, said first platform and said second platform being coordinated to improve performance of said RF emission measurement device.

14. A RF emission measurement device comprising:
a receiver,
wherein said receiver is configured to detect at least one electronic device by passively measuring without active illumination at least one unintended RF emission given off by said at least one electronic device,
wherein the RF emission measurement device is used to verify that said at least one electronic device is neutralized.

15. A RF emission measurement device comprising:
a receiver,
wherein said receiver is configured to detect at least one electronic device by passively measuring without active illumination at least one unintended RF emission given off by said at least one electronic device,
wherein the RF emission measurement device is used to verify that said at least one electronic device is suppressed.

16. A RF emission measurement device comprising:
a receiver,
an electromagnetic source for enhancing at least one RF emission signature,
wherein said receiver is configured to detect at least one explosive device by measuring at least one unintended enhanced RF emission given off by said at least one explosive device and enhanced by the electromagnetic source,
wherein the RF emission measurement device operates in an active automated detection mode and a passive automated detection mode with correlation between said active automated detection mode and said passive automated detection mode.

17. A RF emission measurement device comprising:
a receiver,
an electromagnetic source for enhancing at least one RF emission signature,
wherein said receiver is configured to detect at least one electronic device by measuring at least one unintended enhanced RF emission given off by said at least one electronic device and enhanced by the electromagnetic source,
wherein the RF emission measurement device verifies suppression of an IED.

18. A RF emission measurement device comprising:
a receiver,
an electromagnetic source for enhancing at least one RF emission signature,
wherein said receiver is configured to detect at least one electronic device by measuring at least one unintended enhanced RF emission given off by said at least one electronic device and enhanced by the electromagnetic source, wherein the RF emission measurement device verifies suppression of said at least one electronic device.

19. A RF emission measurement device comprising:
a receiver,
an electromagnetic source for enhancing at least one RF emission signature,
wherein said receiver is configured to detect at least one electronic device by measuring at least one unintended enhanced RF emission given off by said at least one electronic device and enhanced by the electromagnetic source,
wherein the RF emission measurement device correlates measurements between active and passive detection for electronic device detection.

20. A RF emission measurement device comprising:
a receiver,
wherein said receiver is configured to detect at least one electronic device by passively measuring without active illumination at least one unintended RF emission given off by said at least one electronic device, and
wherein said at least one unintended RF emission is compared to at least two received RF emissions.

21. A RF emission measurement device comprising:
a receiver,
wherein said receiver is configured to detect at least one electronic device by passively measuring without active illumination at least one unintended RF emission given off by said at least one electronic device, and
wherein said at least one unintended RF emission is compared to at least two separately received pre-collected RF emissions.

22. A RF emission measurement device comprising:
a receiver,
wherein said receiver is configured to detect at least one electronic device by passively measuring without active illumination at least one unintended RF emission given off by said at least one electronic device,
wherein said at least one unintended RF emission is compared to at least two separately received pre-collected RF emissions, and
wherein a characteristic of a bomb trigger is determined.

23. A RF emission measurement device comprising:
a receiver,
wherein said receiver is configured to detect at least one electronic device by passively measuring without active illumination at least one unintended RF emission given off by said at least one electronic device,
wherein said at least one unintended RF emission is compared to at least two separately received pre-collected RF emissions, and
wherein a status of a bomb trigger is verified.

24. A RF emission measurement device comprising:
a receiver,
wherein said receiver is configured to detect at least one electronic device by passively measuring without active illumination at least one unintended RF emission given off by said at least one electronic device,
wherein said at least one unintended RF emission is compared to at least two separately received pre-collected RF emissions, and
wherein a characteristic of at least one component of a bomb trigger is determined.

25. A RF emission measurement device comprising:
a receiver,
wherein said receiver is configured to detect at least one electronic device by passively measuring without active illumination at least one unintended RF emission given off by said at least one electronic device,
wherein said at least one unintended RF emission is compared to at least two separately received pre-collected RF emissions, and
wherein a status of at least one component of a bomb trigger is verified.

26. The RF measurement device of claim 14, wherein said at least one electronic device is neutralized by means of active illumination.

* * * * *